US010339487B2

(12) United States Patent
Schneeman

(10) Patent No.: US 10,339,487 B2
(45) Date of Patent: Jul. 2, 2019

(54) SYSTEMS AND METHODS TO RECONCILE FREE-TEXT WITH STRUCTURED DATA

(71) Applicant: HomeAway.com, Inc., Austin, TX (US)

(72) Inventor: Brent T. Schneeman, Austin, TX (US)

(73) Assignee: HomeAway.com, Inc., Austin, TX (US)

( * ) Notice: Subject to any disclaimer, the term of this patent is extended or adjusted under 35 U.S.C. 154(b) by 548 days.

(21) Appl. No.: 14/247,192

(22) Filed: Apr. 7, 2014

(65) Prior Publication Data

US 2015/0286977 A1 Oct. 8, 2015

(51) Int. Cl.
  *G06F 17/22* (2006.01)
  *G06Q 10/06* (2012.01)
  *G06F 17/27* (2006.01)

(52) U.S. Cl.
  CPC ..... *G06Q 10/06393* (2013.01); *G06F 17/274* (2013.01); *G06F 17/2785* (2013.01)

(58) Field of Classification Search
  CPC ............ G06F 17/2785; G06F 17/2765; G06F 17/277; G06F 17/274; G06Q 10/06393
  See application file for complete search history.

(56) References Cited

U.S. PATENT DOCUMENTS

| | | | |
|---|---|---|---|
| 6,963,848 B1 * | 11/2005 | Brinkerhoff | G06Q 10/0639 705/7.32 |
| 7,065,494 B1 * | 6/2006 | Evans | G06Q 10/06393 705/7.32 |
| 7,363,214 B2 * | 4/2008 | Musgrove | G06F 17/277 704/9 |
| 7,814,029 B1 * | 10/2010 | Siegel | G06Q 30/0282 705/1.1 |
| 8,126,882 B2 * | 2/2012 | Lawyer | G06Q 10/063 707/723 |
| 8,150,842 B2 * | 4/2012 | Brougher | G06Q 10/063 707/723 |
| 8,990,124 B2 * | 3/2015 | Tsaparas | G06F 16/313 705/347 |
| 2005/0034071 A1 * | 2/2005 | Musgrove | G06F 17/277 715/256 |
| 2006/0123000 A1 * | 6/2006 | Baxter | G06F 16/30 |
| 2006/0143158 A1 * | 6/2006 | Ruhl | G06F 16/951 |

(Continued)

*Primary Examiner* — Maikhanh Nguyen
(74) *Attorney, Agent, or Firm* — Knobbe, Martens, Olson & Bear, LLP

(57) ABSTRACT

The present application relates generally to systems, software and electronic commerce. More specifically, systems, methods and software to reconcile free-text with structured data are disclosed. Structured data may be in the form, for example, of a set of attributes designated as associated with an occupiable property. Free-text may be parsed and one or more terms, words, phrases or the like may be extracted by the parsing and compared with the structured data to determine if there is a difference between the structured data and the free-text it is compared with. Detected differences may be reported (e.g., to an endpoint) in real-time or near real-time and may include a suggestion or recommendation to change the free-text to more closely match the structured data or to change the structured data to more closely match the free-text, or both, for example. An endpoint may be a client device such as a smartphone, tablet, pad, or the like.

13 Claims, 11 Drawing Sheets

(56) References Cited

U.S. PATENT DOCUMENTS

| | | | | |
|---|---|---|---|---|
| 2006/0277290 | A1* | 12/2006 | Shank | G06Q 10/00 |
| | | | | 709/223 |
| 2007/0078670 | A1* | 4/2007 | Dave | G06F 17/274 |
| | | | | 705/347 |
| 2008/0195480 | A1* | 8/2008 | Calabria | G06Q 10/10 |
| | | | | 705/14.36 |
| 2009/0006185 | A1* | 1/2009 | Stinson | G06Q 10/10 |
| | | | | 705/306 |
| 2009/0063630 | A1* | 3/2009 | Obasanjo | G06Q 30/02 |
| | | | | 709/204 |
| 2009/0157490 | A1* | 6/2009 | Lawyer | G06Q 10/063 |
| | | | | 705/59 |
| 2009/0157667 | A1* | 6/2009 | Brougher | G06Q 10/063 |
| 2009/0299824 | A1* | 12/2009 | Barnes, Jr. | G06F 3/04847 |
| | | | | 705/7.39 |
| 2012/0197903 | A1* | 8/2012 | Lu | G06Q 30/02 |
| | | | | 707/748 |
| 2012/0245924 | A1* | 9/2012 | Brun | G06F 17/2765 |
| | | | | 704/9 |
| 2013/0179423 | A1* | 7/2013 | Gur | G06F 17/30867 |
| | | | | 707/710 |

* cited by examiner

161

Please Enter Your Review Text in the Box Below

"My husband and I wanted to say thank you for providing this lovely beach home for us to enjoy. We are thankful for the beach chairs, cruiser bicycles, cooler, Jacuzzi, boogie boards, sauna, out-door shower and sand toys which were used daily. Everything in this vacation rental was in perfect order. There is no doubt we will be back again! We had a wonderful time!"

197

Please Check the Box Your Star Rating Below

☐ ★ ★ ★ ★ ★  Five Stars = Excellent

☐ ★ ★ ★ ★  Four Stars = Good

198c

☒ ★ ★ ★  Three Stars = Fair

☐ ★ ★  Two-Stars = Did Not Meet Expectations

☐ ★  One-Star = Unacceptable

198

Please Press or Click Here to Submit Your Review

SUBMIT REVIEW
199

FIG. 1C

Dear Reviewer: Please review the text in the review you just submitted, paying close attention to the underlined text to see if you would like to reconsider your three-star rating based on the positive words used in your review.

163

Thank you!

> "My husband and I wanted to say thank you for providing this lovely beach home for us to enjoy. We are thankful for the beach chairs, cruiser bicycles, cooler, Jacuzzi, boogie boards, sauna, out-door shower and sand toys which were used daily. Everything in this vacation rental was in perfect order. There is no doubt we will be back again! We had a wonderful time!"
>
> 197a

FIG. 1D

Dear Reviewer: May we suggest increasing your star rating from three-stars to five-stars or to at least four-stars so that your selected star rating more closely matches the positive words in your review? If you agree, please check the appropriate star rating box below and Press or Click the Re-Submit Review icon below.

164

☒ ★ ★ ★ ★ ★  Five Stars = Excellent  (198c)

☐ ★ ★ ★ ★  Four Stars = Good

198a

RE-SUBMIT REVIEW
199a

FIG. 1E

162 → Please Enter Your Review Text in the Box Below

"We enjoyed our stay in the Elle tremendously!! The farm was clean and well-maintained. The grounds keeper met us upon arrival and showed us how everything worked. When she gave us the wireless internet password, we were shocked as we didn't know internet was included. If we had know we would have brought our laptops. However, we got by using or smartphones instead. We were so thankful to have such a beautiful and well-stocked kitchen and pantry that we ate in almost every night and then enjoyed a cozy evening reading by the fireplace. The second fireplace in the master bedroom was an unexpected surprise. The Peninsula was stunning and we took every opportunity to walk on the walking trails. Thank-you for a wonderful relaxing two weeks!!" 497

400a

167 →

Property Description (e.g., Amenities)

- ☐ Internet Access — 498d
- ☒ Kitchen — 498c
- ☐ Pantry — 498d
- ☒ Fireplace — 498c
- ☐ Additional Fireplaces — 498d
- ☒ Hiking/Walking Trails — 498c

SYSTEMS AND METHODS TO RECONCILE FREE-TEXT WITH STRUCTURED DATA

FIELD

The present application relates generally to systems, software and electronic commerce. More specifically, systems, methods and software to reconcile free-text with structured data are disclosed.

BACKGROUND

Interactions and transactions between parties sometimes require that one of the parties provide feedback in the form of a review or rating, for example. Integrity and usefulness of reviews and/or ratings may be improved when discrepancies between elements of the review and/or rating that are provided by the reviewer are minimized or altogether eliminated. In some applications a reviewer may enter a text based review of some experience the reviewer had with a subject of the review (e.g., a rental property). The reviewer may also enter a rating, such as a star rating or other to indicate the overall sentiment of the reviewer regarding the experience. It is not uncommon for a reviewer to submit a textual review that gives an overall impression that the reviewer had a very positive experience, while also submitting a star rating that is not consistent with the textual review. As one example, the star rating may be two-stars (e.g., the experience did not meet expectations) and the textual review may indicate the reviewer had a good experience which is more akin to a four-star rating. Therefore, it is desirable to fix discrepancies between the textual review and the star rating before the review is posted, published, or otherwise disseminated.

In some instances, a person or entity having a proprietary interest in the subject being reviewed may provide a description of the subject that includes several features, fixtures, amenities, services or other. However, in a subsequent review, a reviewer may include text that describes something that was omitted in the description. Ideally, it would be desirable to detect discrepancies between review text and description and notify the person or entity having the proprietary interest of the discrepancy so that corrective action may be taken. Preferably, the discrepancies and the aforementioned discrepancies are corrected in real time or in as timely a manner as possible to ensure description data is accurate and to prevent misleading and/or confusing review data from being widely disseminated to a larger audience.

Thus, there is a need for systems, methods and software that reconciles discrepancies in reviews in a timely manner.

BRIEF DESCRIPTION OF THE DRAWINGS

Various embodiments or examples ("examples") of the present application are disclosed in the following detailed description and the accompanying drawings. The drawings are not necessarily to scale:

FIG. 1C depicts one example of free-text review data and a star rating submitted for a review of a res according to an embodiment of the present application;

FIG. 1D depicts one example of a discrepancy between a rating value and review text that may be communicated to a client according to an embodiment of the present application;

FIG. 1E depicts one example of a remedy to cure a discrepancy between a rating value and review text that may be communicated to a client according to an embodiment of the present application;

FIG. 4A depicts one example of free-text review data and structure description data for a review of a res according to an embodiment of the present application;

DETAILED DESCRIPTION

Various embodiments or examples may be implemented in numerous ways, including as a system, a process, a method, an apparatus, a user interface, or a series of program instructions on a non-transitory computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1A:
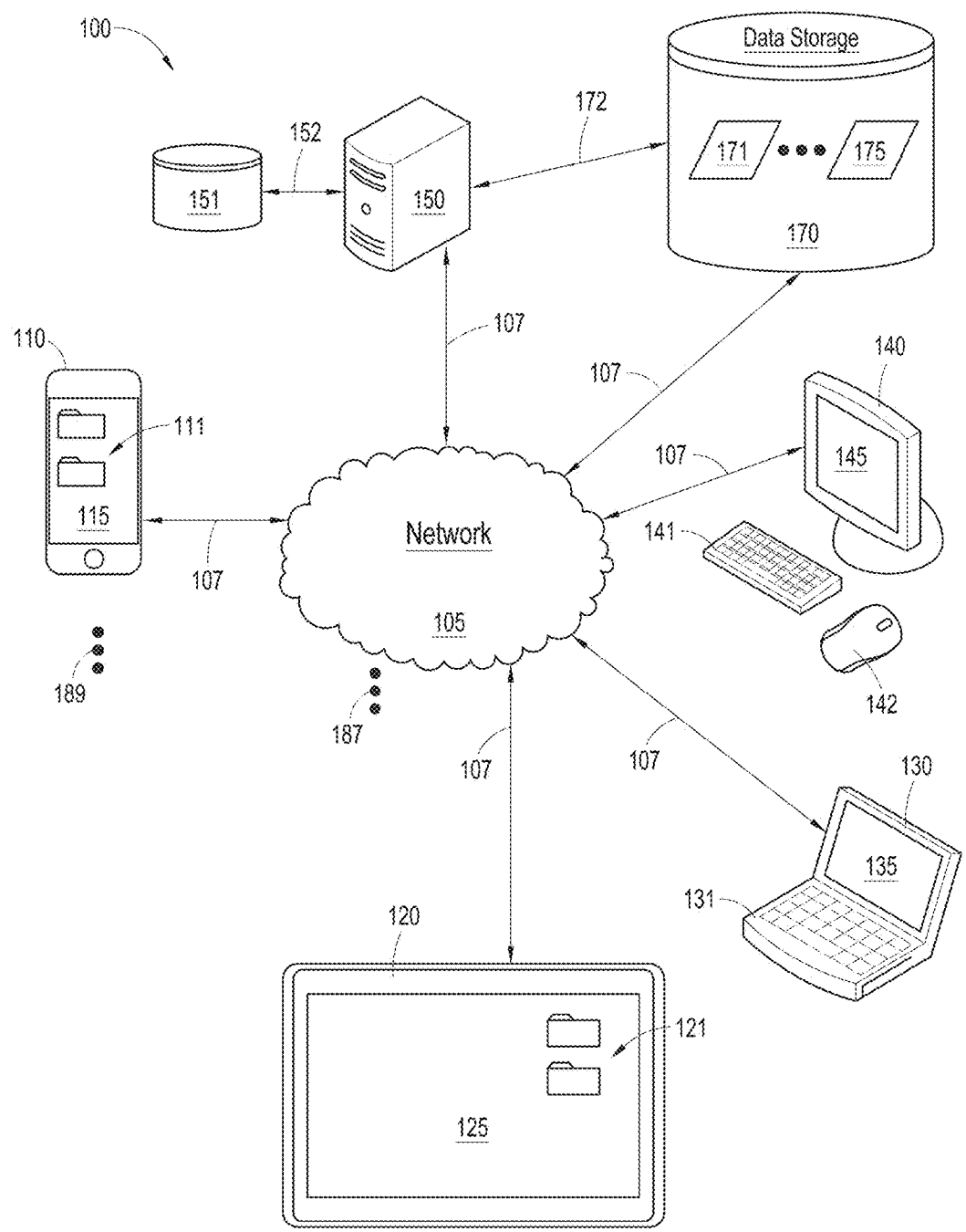
FIG. 1A depicts an exemplary system according to an embodiment of the present application.

FIG. 1A depicts an exemplary system 100 for reconciling free-text with structured data. System 100 may include a network 105 (e.g., a data communications network), a processor 150 (e.g., a server, PC, compute engine or the like), data storage 170 (e.g., a data storage system, RAID, HDD, SSD, NAS, Cloud storage, Flash Memory, RAM, etc.), one or more client devices (client hereinafter) that may be wired devices, wireless devices or both, and denoted as 110, 120, 130 and 140. Network 105 may be configured to provide communications 107 using wired (e.g., LAN, Ethernet, Optical), wireless (e.g., WiFi, IEEE 802.1, 2G, 3G, 4G, 5G, Cellular, WiMAX, Bluetooth, Broadband, Ultra Wide Band, Bluetooth Low Energy, NFC, etc.), or both between the various components (e.g., client devices) of system 100 as depicted in FIG. 1A. In some applications network 105 may comprises the Internet, the Cloud, a web site, a web page, data storage (e.g., data storage 170, NAS, RAID, or Cloud storage) or other resource that may be electronically accessed using wired or wireless data communications. Although a single network 105 is depicted, the present application is not limited to a single network and there may be a plurality of networks 105 as denoted by 187. Processor 150 may be in communication 152 with a data storage unit 151 (e.g., HDD, SSD, RAID, NAS, Cloud storage, Flash Memory, RAM, etc.).

Data storage 170 and processor 150 may be in communication 172 with each other using a wired link, wireless link, or both. Data storage 170 although depicted separately from processor 150 and network 105, may be included in processor 150 and/or network 105. Alternatively or in addition to communication 172, data storage 170 and processor 150 may be in communication with each other via network 150. Clients in system 100 may include but are not limited to a smartphone 110, a tablet or pad 120, a laptop 130, and desktop PC 140. In some examples, one or more clients may be an endpoint as will be described below. System 100 may include more or fewer clients than depicted in FIG. 1A as denoted by 189. Clients in system 100 may be in communication (e.g., 107) with one or more networks 105 as denoted by 187. Moreover, system 100 is not limited to the types of clients depicted in FIG. 1A. System 100 may be dynamic and from time to time may include changing numbers of clients (e.g., from 0 clients to N clients). Some clients may include input devices such as keyboards (131, 141), a mouse 142, or other (e.g., a stylus). Clients may include a display device (115, 125, 135, 145) for entering and/or displaying information to/from components of system 100 such as processor 150, for example. For examples, displays may include a GUI, dashboard, icons, folders, symbols (e.g., 111, 121) or the like that may be representative of information, components, programs, applications, data, etc. In some examples a client may serve as an endpoint as will be described in greater detail below.

Figure 1B:
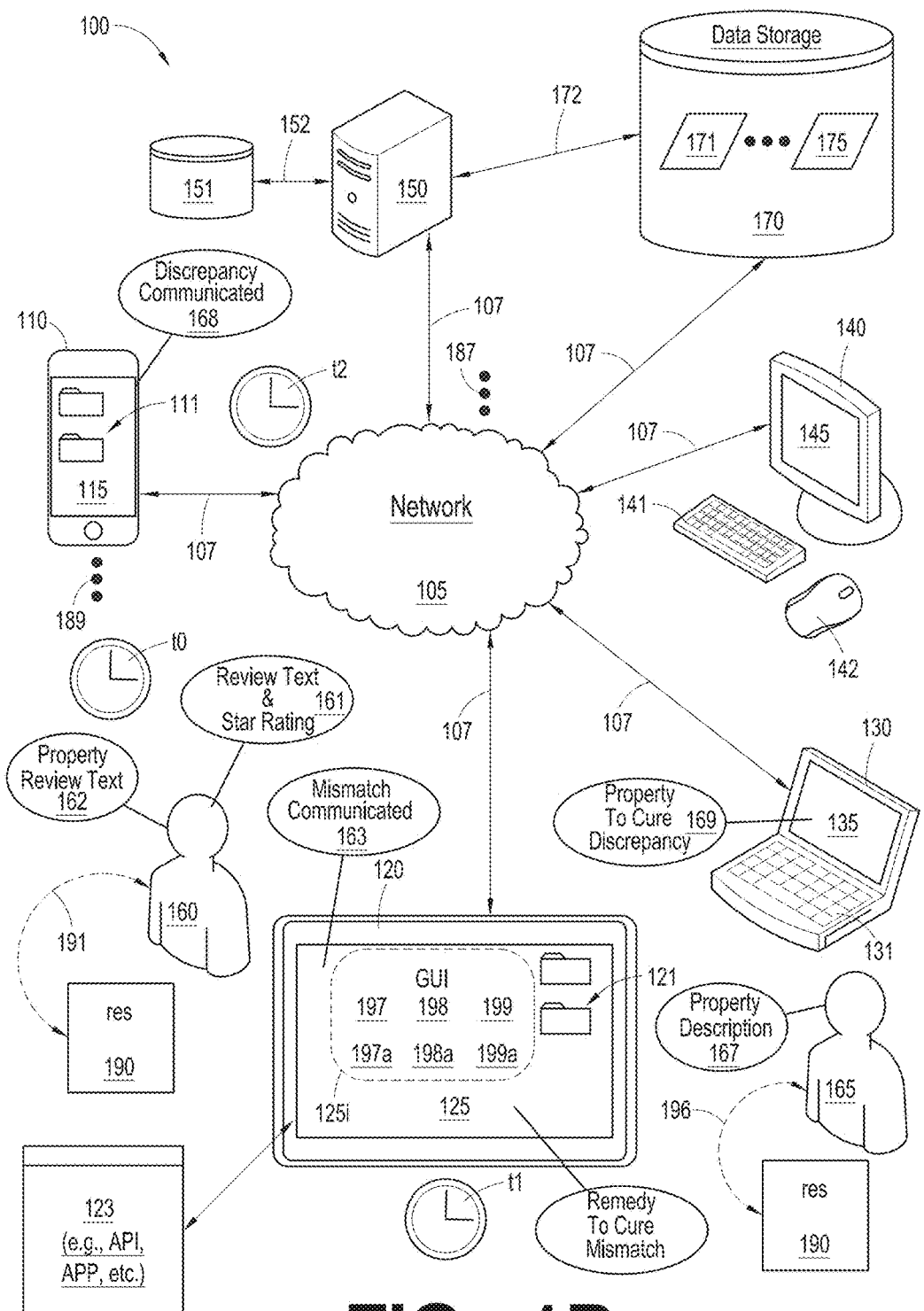
FIG. 1B depicts another exemplary system according to an embodiment of the present application.

Turning now to FIG. 1B where for purpose of explanation, one or more users 160 and 165 are depicted in system 100 to illustrate user interaction with the system 100 and its various components. However, unless otherwise stated herein, the users depicted may not be components of the system 100. Additionally, for purposes of explanation information related to a res (e.g., a thing, object, or matter) are depicted in FIG. 1B as res 190 and res 195. Res 190 and 195 may not be part of the system 100; however, information about res 190 and res 195 may be used or may reside in memory (e.g., data storage 170 and/or other) and that information may be used by system 100. Some of the information may be entered by a user such as user 160 and/or 165 using a client, for example. Non-limiting examples of a res include but are not limited to real property, personal property, a leasehold, a vehicle, a charter, a vacation rental, a hotel/motel room, a bread and breakfast (B&B) rental, a mode of transportation, a service, a transaction, a rental, an experience, an event, entertainment, a barter, just to name a few. One or more clients in system 100 may provide data input to the system 100 such as review text, property review text, property descriptions, ratings, and star ratings, for example. Furthermore, one or more clients in system 100 may serve as an endpoint for data output from system 100 (e.g., from processor 150) such as a remedy for a discrepancy or a remedy for a property description, for example. In some examples, a discrepancy may also be referred to as a mismatch, deviation, or delta between review text and a rating (e.g., a star rating) associated with the review text and/or between review text and a property description. Discrepancies, mismatches, deviations, or deltas may not be sharp differences such as "0" or "1" or "Yes" or "No" between review text and rating or property description, but rather may be more analog in nature. For example, a very positive review may not necessarily map to a five-star rating, but rather to a four-star rating, or a negative review may not necessarily map to a one-star rating, but rather to a two-star rating or perhaps a neutral three-star rating. The manner in which free-text may be parsed (e.g., analyzed) and compared to a curated corpus will be applications specific and the foregoing are non-limiting examples.

Reconciling Free-Text with Structured Data

As a first example of how system 100 may be used to reconcile free-text with structured data, consider user 160 who may have reliable knowledge related to res 190 (e.g., knowledge from a stay at a vacation rental) and this knowledge may be first-hand knowledge or knowledge by way of another reliable source the user 160 trusts (e.g., a spouse, friend, colleague, associate, significant other, etc.). In short, user 160 may make a reliable review regarding aspects of the user's 160 experience 191 related to res 190. User 160 may of his/her own accord initiate a review and rating of experience 191 or may be prompted or solicited (e.g., via an email, mail, SMS, instant messaging, text message or other communication) to provide a review of the experience 191, in either case, user 160 may use client 120 to enter the information for the review of res 190. For purposes of this example, assume res 190 may be a vacation rental comprising a two bedroom, one and a half bathroom condo located on a beach, and user 160 and a spouse stayed at res 190 for 4 days and 3 nights. Moreover, assume user 165 has a proprietary interest 196 in res 190 (e.g., as an owner of res 190 or an agent (e.g., property manager) for an owner of res 190). User 160 uses client device 120 (e.g., via a GUI 125*i* on display 125) to enter review text and a star rating denoted as 161. The star rating may use any number of stars or numbers, but for purposes of explanation a five star rating system is used, where: five-stars is "excellent"; four-stars is "good"; three-stars is "fair"; two-stars is "did not meet expectations"; and one-star is "unacceptable". Other words or adjectives may be used in a star rating system and the words selected for the five star rating systems are non-limiting examples of one possible implementation of a star rating system.

Referring now to FIG. 1C, at review submission time t0, user 160 submits a review 161 of their stay at res 190 that includes entering 198 a star rating of three out of five stars for a three-star rating, and entering 197 the review text below to textually describe the user's 160 experience in regards to the stay at res 190. A keyboard displayed on a GUI of screen 125 on client 120 may be used to enter the review text and a finger of user 160 or a stylus may be used to check 198*c* the box for the three-star rating. Client 120 and/or other clients may include software, firmware, algorithms, executable program code or the like including but not limited to an application programming interface (API), an application (APP), a dashboard, a web page, a user interface or other software that presents information to the user to consider and possibly act on (e.g., on a GUI 125*i* on display 125 that presents icons and text boxes depicted in FIGS. 1C-1E for the user to enter/re-consider text 197/197*a*, check/change a star rating 198/198*a*, and submit/re-submit 199/199*a* the review). An example of text entered 197 by user 160 may read as follows:

"My husband and I wanted to say thank you for providing this lovely beach home for us to enjoy. We are thankful for the beach chairs, cruiser bicycles, cooler, Jacuzzi, boogie boards, sauna, out-door shower and sand toys which were used daily. Everything in this vacation rental was in perfect order. There is no doubt we will be back again! We had a wonderful time!"

After entering the three-star rating and the review text, the user 160 submits 199 the review by hitting enter or activating (e.g., using a finger, mouse click or stylus) some other type of icon or the like on screen 125 of client 120 to submit the review. Client 120 communicates 107 the review data over network 105 to processor 150 which includes hardware, software, or both configured to receive the review text and the star rating. For purposes of explanation, the review text will be denoted as free-text review data in that it may its text may not be structured or regulated to be entered in a specific form. The star rating will be denoted as structured data because it may be structured or regulated to be entered a specific form such as only one of five star rating choices, as described above. Processor 150 may parse or otherwise analyze the free-text review data to extract from that data one or more predetermined textual terms (e.g., key strings of one or more words) that may be associated with different sentiments including but not limited to "love", "loved", "lovely", "hate", "hated", "beautiful", "broken", "serene", "odor", "smelled", "wonderful", "filthy", "okay", "dirty", "ghetto", "plumbing", "wonderful", "dated", "broken", "clean", "leak", "un-clean", "thank", "thankful", "thanks", "dark", "welcomed", "excellent", "perfect", "great view", "can't wait to come back", "thank you", "better than", "we will be back", "all the comforts of home", "enjoyed", "enjoy", "next summer", for example.

Now referring back to the free-text review data entered by user 160 in FIG. 1C, the parsing by processor (e.g., using an algorithm) may detect the following key words that may be commonly associated with positive sentiments towards a res, such as in the example of res 190: "thank you"; "we will be back again!"; "thankful"; "a wonderful time!"; "lovely beach home"; and "enjoy". Processor 150 may have access 172 or 107 to a curated corpus of reviews 171 (e.g., in data storage 170) that includes data associated with disparate sentiments such as positive sentiments, neutral sentiments, and negative sentiments, for example. Corpus 171 may include curated reviews for a positive review model (e.g., models of free-text associated with positive sentiments), a negative review model (e.g., models of free-text associated with negative sentiments), and a neutral review model (e.g., models of free-text associated with neutral sentiments). The predetermined textual term extracted by the parsing may be a single word such as "lovely" from "lovely beach home", "perfect" from "perfect order" or "enjoy" from "us to enjoy" or multiple words such as "will be back again" from "we will be back again!", "wonderful time" from "a wonderful time" or "thank" from "My husband and I wanted to say thank you". The words extracted may be the most relevant and/or useful words from the text that best describe the reviewers sentiment, such as "lovely" from "lovely beach home" or "We are thankful" from "We are thankful for the beach chairs . . . ", for example. Some or all of those predetermined textual terms extracted by the parsing may be compared by processor 150 with the sentiment models in curated corpus 171. Positive review model may have one or more datum's that when compared to one or more of the predetermined textual term will indicate a match between the datum and the predetermined textual term. For example, the positive review model may include a datum's for "lovely", "enjoy", "wonderful" and "wonderful time". Each of those datum's may reside in the positive review model because as curated, those word(s) may be associated with a positive experience 191 (e.g., a positive sentiment). Similarly, word(s) associate with a negative experience (e.g., a negative sentiment) may reside in the negative review model and word(s) associate with a neutral experience (e.g., a neutral sentiment) may reside in the neutral review model.

Discrepancy Handling and Remedies to Cure Discrepancies

Taken as a whole, the free-text parsed from the review text 197 may be associated with those of a positive experience 191 by user 160 in regard to res 190. Therefore, in the above example, the structured data three-star rating 198 selected by user 160 does not match the free-text 197 entered by user 160. If the star rating and the review text are published as entered by user 160, people that read the posted review may be confused as to whether or not the reviewer had a "fair" experience based on the three-star rating or an "excellent" experience based on the review text. In that the review text entered 197 by user 160 may be more akin to a five-star rating based on the number of positive sentiment words in the review text, it would be prudent to reiterate on the review process by asking the reviewer if they are sure the review is accurate prior to finalizing the review for posting.

Processor 150 upon detecting a mismatch between the sentiment conveyed by the review text 197 and star rating 198 may communicate a mismatch 163 (e.g., via 107) to an endpoint (e.g., client 120 or another client) where a message, text, icon or the like displayed on display 125 conveys the mismatch information to user 160 at a time t1, which may be only a matter of seconds or less after the user 160 submitted 199 the review. An endpoint may be at least one client device or may be some other device or system configured to receive data, process the data, and communicate the data (e.g., via a display). In some applications an endpoint may be several devices, such as a plurality of client devices or other devices or systems. In some examples, an endpoint may not display information but may store the information. The stored information may be later disseminated and/or communicated by the endpoint. Therefore, system 100 may act in real time (e.g., instantaneously or nearly instantaneously) to analyze review text and ratings, detect mismatches if any, and report to the submitting reviewer the mismatches when detected. Additionally, the system 100 may communicate a remedy to cure the mismatch 164 to a reviewer, such as user 160. The mismatch 163 and cure 164 may be communicated in the same message or communication to endpoint 120 or in different communications or messages to endpoint 120. Communication of the mismatch 163 and cure 164 may occur at the same time (e.g., at t1) or at different times. Communicated mismatch 163 may explain to user 160 that the "fair" three-star rating 198 may be a mistake or have been inadvertently selected because the review text 197 would seem to indicate the user 160 had a very positive experience that may be more consistent with a five-star "excellent" star rating. Communicated remedy 164 to cure the mismatch between the review text and star rating may include but is not limited to: a suggestion to the user 160 to bump up the star rating from three-stars to five-stars; a suggestion to the user 160 to bump up the star rating from three-stars to at least four-stars or higher; and a suggestion to the user 160 to re-enter the review text to be consistent with a three-star experience if the user 160 truly feels the experience 191 deserves three-stars, and to be more specific about what aspects of the experience 191 are attributable to the "fair" three-star rating.

Moving on to FIG. 1D, one example of a mismatch communicated 163 to a client may include a message asking user 160 to review the text in the submitted review and ask the user 160 to focus on one or more words or sentences in the text via highlighted text, underlined text, bold text, italic text, etc. Here, review text 197a includes key words that are underlined to emphasize the positive elements of the review that taken as a whole justify a higher star rating. The mismatch communicated 163 to the client may also include a suggestion for the user 160 to reconsider the three-star rating in favor of a higher star rating based on the positive words found in the submitted review.

In FIG. 1E, one example of a remedy to cure a mismatch 164 may include a suggestion to the user to up the three-star rating to five-stars or to at least four stars at a minimum so that the star rating more closely matches the positive words found in the review text. The suggestion may further seek agreement from the user 160 to check 198c the appropriate four or five-star box in 198a and press or click the re-submit review icon 199a to have the review finalized with a higher star rating (e.g., five-stars) that may be justified based on the positive sentiments of the review text. The depictions of FIGS. 1D-1E are non-limiting examples and the communicated mismatch 163 and/or communicated remedy 164 may be accomplished using different messages, suggestions, or other.

Although the above examples have described positive review models in curated corpus 171, review text 197, the system 100 (e.g., via processor 150) may be configured to handle mismatches between review text and star ratings for review text 197 that more closely matches negative sentiments and negative review models or more closely matches neutral sentiments and neutral review models. Analysis by processor 150 may be configured to take no action by way of communicating mismatches 163 or remedies to cure mismatches 164 if the review text and selected star ratings match. On the other hand, analysis by processor 150 may be configured to communicate mismatches 163 and remedies 164 when the review text may be consistent with a one-star or two-star rating and a star rating of three-stars or above is selected by a user, or if the review text may be consistent with a neutral "fair" experience and a one-star or two-star rating is selected by the user.

As one example, consider the review text below with bold and underlined words being those match the negative review model and the associated star rating of four-stars:

"Upon arrival at the property, we were completely taken aback by its abysmal condition. This vacation rental was dirty, shoddy and in unkempt condition. Just the opposite of the description and pictures listed on the owner's web page. All the window coverings were in a state of disrepair and the condition of the furniture was very basic and of poor quality and comfort. The kitchen had a foul odor and the dishes and utensils were filthy. The automatic dishwasher was broken and the faucet had a leak. The advertised queen size beds were merely double beds! Needless to say, we didn't sleep well. The parking facility was 40-50 yards from the rental and only accessible by walking over a rough gravel and dirt path. At night, the stairwell to the rental was dangerous because it was not brightly lit, leading to slips and stumbles that caused me to trip and bruise my leg. I could not recommend this rental to others and we won't be coming back. Ever!"

As parsed or otherwise analyzed by processor 150, a gist of the above review text may most closely match sentiments in the negative model of the curated corpus 171. However, a four-star rating for the reviewed res does not match the overwhelmingly negative tone of the key bold and underlined text in the above review sample. Therefore, the four-star rating is not likely justified and there may be a mismatch between the negative review text and the positive star rating that may trigger the above mentioned communication of a mismatch 163 and/or remedy to cure 164 to an endpoint in system 100 (e.g., a client such as client 120). Here, the remedy to cure may include a suggestion to reduce the star rating from a four-star to a one-star or two-star rating and provide check boxes for the suggested star ratings and a re-submit review icon, similar to that depicted in FIG. 1E, for example.

As another example, consider a neutral review (see bold and underlined words) which receives a negative star rating of one-star:

"The rental was very spacious considering it is a bungalow. The rental had almost everything we needed to have a great vacation, but lacked a few essentials such as dishes and utensils. The pool is very large and clean and everyone was very friendly; however, the pool was crowded most of the time with families and their children. The bungalow owner was very accommodating, but was not easy to get a hold of if you had any questions. The location was not as close to the many great restaurants and fun activities as we would have liked it to be. This rental was okay and we might consider coming back in the future."

As parsed or otherwise analyzed by processor 150, a gist of the above review text may most closely match sentiments in the neutral model of the curated corpus 171. However, a one-star negative rating for the reviewed res does not match the predominantly neutral tone of the key bold and underlined text in the above review sample. Therefore, the one-star rating is not likely justified and there may be a mismatch between the neutral review text and the negative star rating that may trigger the above mentioned communication of a mismatch 163 and/or remedy to cure 164 to an endpoint in system 100 (e.g., a client such as client 120). Here, the remedy to cure may include a suggestion to increase the star rating from one-star to a three-star or four-star rating and provide check boxes for the suggested star ratings and a re-submit review icon, similar to that depicted in FIG. 1E, for example.

Figure 3A:
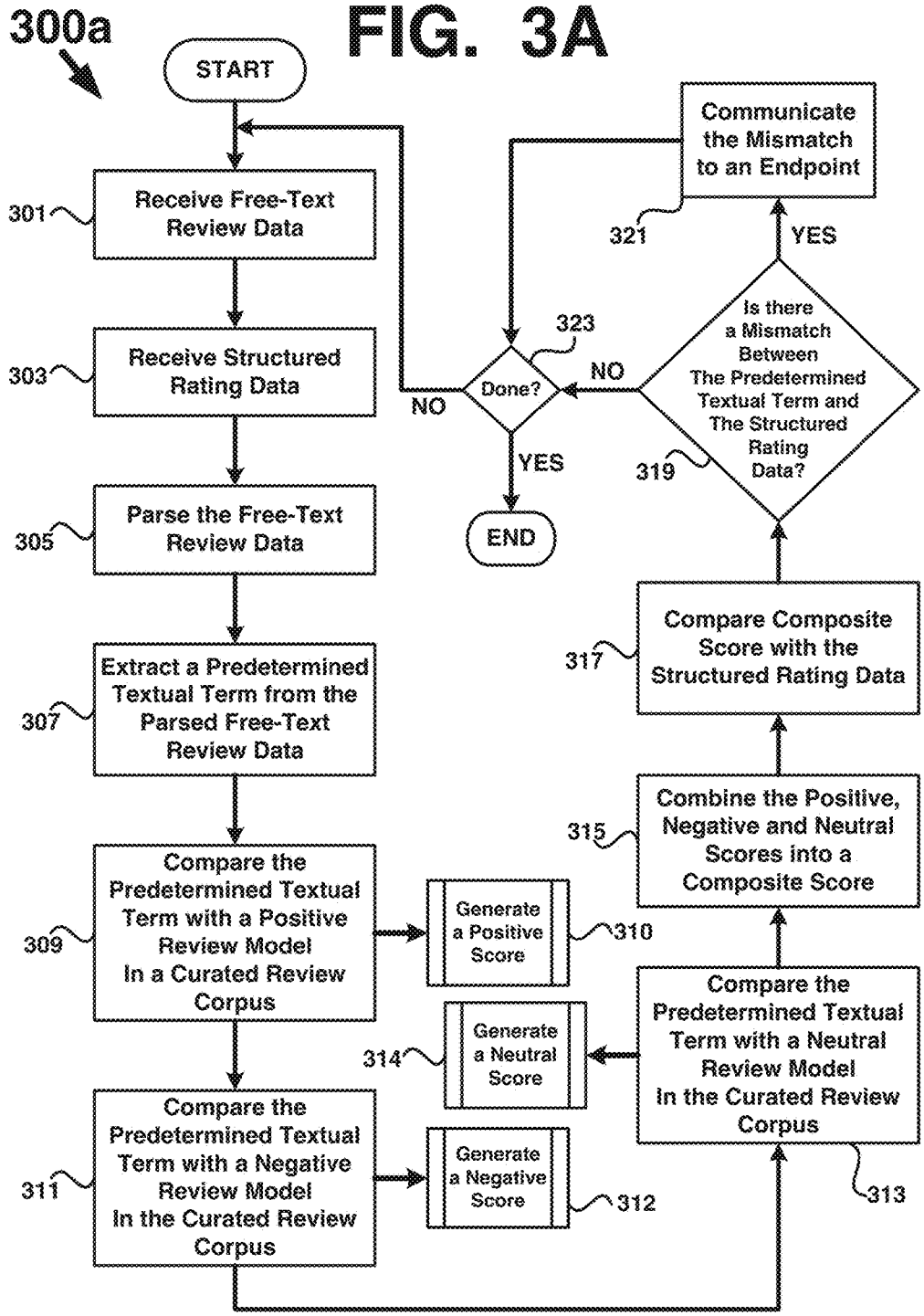
FIG. 3A depicts one example of a flow diagram for a method to reconcile free-text with structured data according to an embodiment of the present application.

FIG. 3A depicts one example of a flow diagram for a method 300a to reconcile free-text with structured data. At review submission time (e.g., at t0), a user may enter data on a client device (e.g., client 120 or other), and a processor, compute engine or other (e.g., processor 150) may at a stage 301 receive free-text review data (e.g., 161 and 197). At a stage 303 structured rating data (e.g., 161 and 198) may be received. At a stage 305 the free-text review data may be parsed and at a stage 307 one or more predetermined textual terms (e.g., a word or words) may be extracted from the parsed free-text review data. At a stage 309 the predetermined textual term(s) may be compared with data in a positive review model in a curated review corpus (e.g., curated corpus 171). At a stage 310 a positive score may be generated based on the comparison at the stage 309. At a stage 311 the predetermined textual term(s) may be compared with data in a negative review model in a curated review corpus (e.g., curated corpus 171). At a stage 312 a negative score may be generated based on the comparison at the stage 311. At a stage 313 the predetermined textual term(s) may be compared with data in a neutral review model in a curated review corpus (e.g., curated corpus 171). At a stage 314 a neutral score may be generated based on the comparison at the stage 313.

At a stage 315 the positive, negative, and neutral scores may be combined into a composite score. At a stage 317 the composite score may be compared with the structured rating data (e.g., the star rating selected by user 160). At a stage 319 a determination may be made as to whether or not there is a mismatch between the predetermined textual term and the structured rating data based on the comparison at the stage 317. If there is a mismatch, then a YES branch may be taken to a stage 321 where the mismatch may be communicated to an endpoint (e.g., a client in system 100). From the stage 321 a determination may be made at a stage 323 as the whether the method 300a is done. Here, done may mean there may be no more free-text data being received. If the method 300a is done, then a YES branch may be taken and the method 300a may terminate. If the method 300a is not done, then a NO branch may be taken and the method 300a may resume at one of the prior stages, such as stage 301 or some other stage such as 305, for example.

Figure 3B:
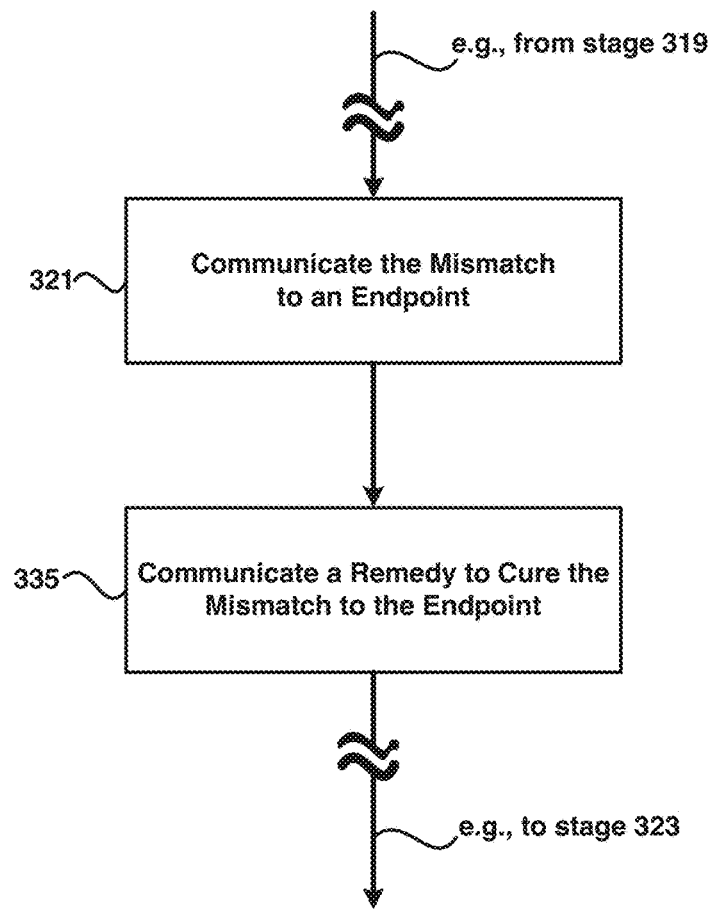
FIG. 3B depicts an example of optional stages for the method of FIG. 3A according to an embodiment of the present application.

If at the stage 319 there is no mismatch, then a NO branch may be taken to the stage 323 and the method 300a may resume at a prior stage or terminate as described above. In FIG. 3B optional stages may be executed subsequent to the stage 319. For example, after the stage 321, a stage 335 may be implemented to communicate a remedy to cure the mismatch detected at the stage 319. As described above, the endpoint may be one of the clients in system 100, such as client 120 or other. After executing the stage 335, the method 300a may resume at another stage, such as stage 323, for example.

Figure 4B:
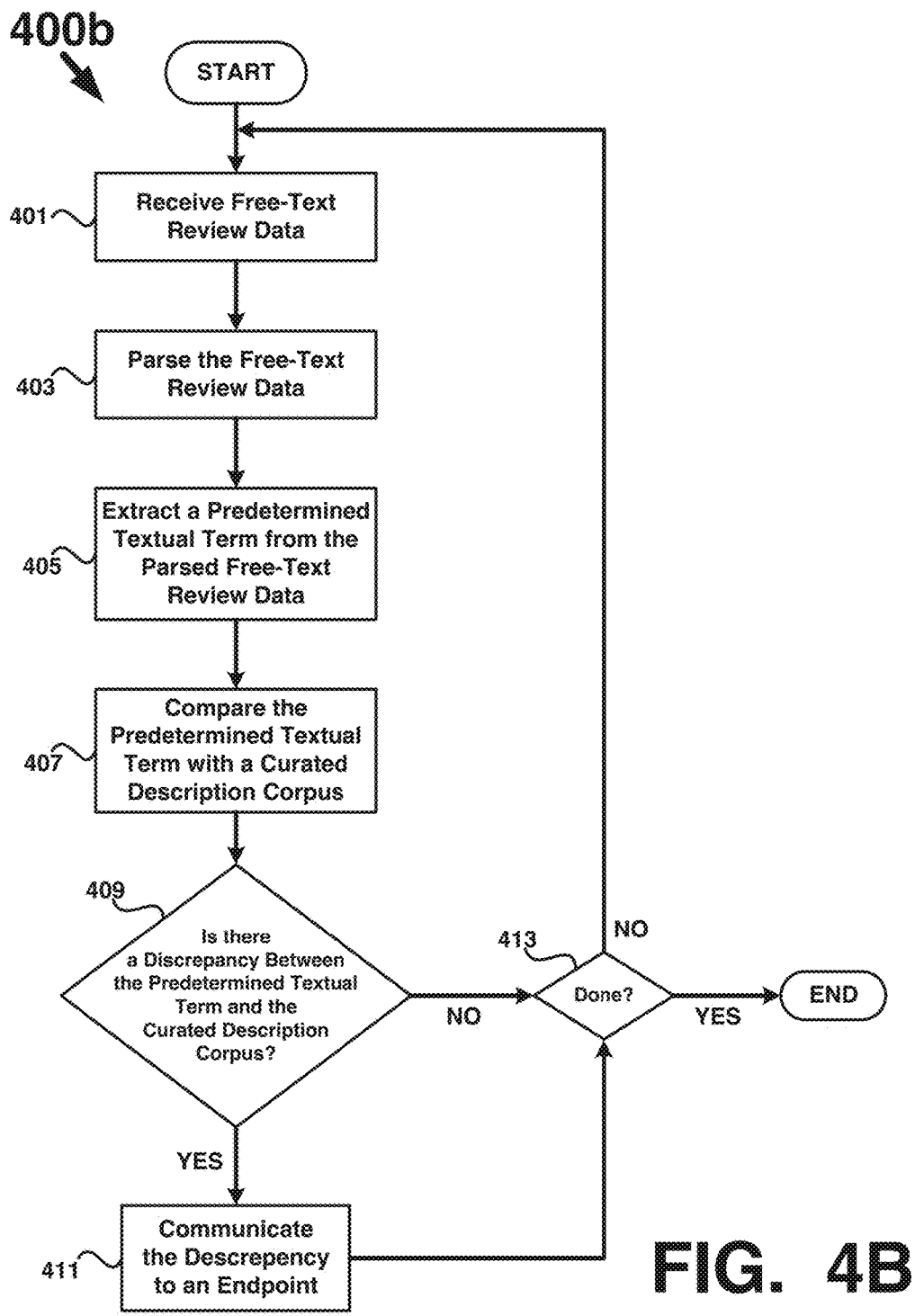
FIG. 4B depicts yet another example of a flow diagram for a method to reconcile free-text with structured data according to an embodiment of the present application.

Turning now to FIG. 4A, another example 400a of free-text in the form review text 162 and structured data in the form of property description 167 are depicted. For purposes of explanation, the words discrepancy and/or discrepancies will be used instead of mismatch or mismatches in the following description related to FIGS. 4A-4C. In FIG. 1B a user 165 may be an owner, property manager, agent or the like that has a proprietary interest 196 in a res such as res 190 and therefore has knowledge of the particulars of the res 190, such as its amenities, for example. For purposes of explanation, assume that user 165 or someone operating on behalf of user 165 has entered the property description 167 of res 190 and that description includes many amenities of which only a few are depicted in FIG. 4A. Here, user 165 has noted in the property description by checking 498c the appropriate boxes that res 190 includes the amenities such as a kitchen, a fireplace, and access to hiking/walking trails. In the property text review 162, user 160 has mentioned the checked 498c amenities; however, user 160 also textually describes other amenities that may not be included in the property description 167 that are denoted as un-check boxes 498d. Namely, a discrepancy between the property description 167 and the review text 162 exists because the review mentions that wireless internet was available for the guests to access, but the property description has the internet access box un-checked 498b. The review text describes a second fireplace in the master bedroom, but in the property description 167 the additional fireplaces box is un-checked 498b. Finally, the review text mentions that the kitchen includes a pantry, but the pantry box in the property description 167 is un-checked 498b.

The property description 167 may comprise structured data to the extent that it may be formatted for entry of data in structured manner, such as checking 498b a box that identifies an amenity of the res 190. A curated description corpus 175 of property descriptions may be include in data storage 170 and may be used to compare against parsed or otherwise analyzed free-text (e.g., the underlined words in 497) from the review text 162 to see if there is a discrepancy between the curated description corpus and the review text 162 (e.g., one or more predetermined textual terms parsed from the review text 162). At review submission time t0 the user may enter the property review text 162 and star rating (not shown) and hit enter as described above in reference to FIG. 1C. Processor 150 may receive the review text 162, parse the free-text in 162, extract one or more predetermined textual terms from the parsed free-text, compare the predetermined textual terms with the curated description corpus 175, detect whether or not there are discrepancies between the curated description corpus 175 and the predetermined textual terms, and communicate 168 (e.g., at time t2) any detected discrepancies to an endpoint, such as client 110. Optionally, processor 150 may communicate a remedy to cure the discrepancy 169 to an endpoint, such as client 130 or 110, for example. Discrepancy 168 and remedy 169 may be communicated to the same or different endpoints. Here, upon receiving the communications regarding the discrepancy 168 the user 165 may take action to update or otherwise amend or correct the property description on his/her own accord or per the optional remedy to cure 169. As one example, res 190 may be more attractive to future renters if it includes internet access, a second fireplace, or a stocked pantry. The user 165 taking action to more accurately describe the amenities of res 190 in property description 167 may lead to more interest by renters and higher property star ratings and favorable property reviews.

FIG. 4B depicts an example of a flow diagram for a method 400b to reconcile free-text with structured data that may be applied to detecting and curing where necessary, discrepancies in property descriptions 167. At review submission time (e.g., t0) free-text review data may be received at a stage 401. At a stage 403 the free-text data may be parsed. At a stage 405 one or more predetermined textual terms may be extracted from the free-text review data. At a stage 407 the one or more predetermined textual terms may be compared with data from curated description corpus (e.g., 175). At a stage 409 a determination may be made as to whether or not there is a discrepancy between the one or more predetermined textual terms and the curated description corpus (e.g., 175). If there are no discrepancies, then a NO branch may be taken to a stage 413. If the method 400b is done, then a YES branch may be taken at the stage 413 the process may terminate. If the method 400b is not done, then a NO branch may be taken at the stage 413 to some prior stage of the method 400b such as the stage 401 or other.

Figure 4C:
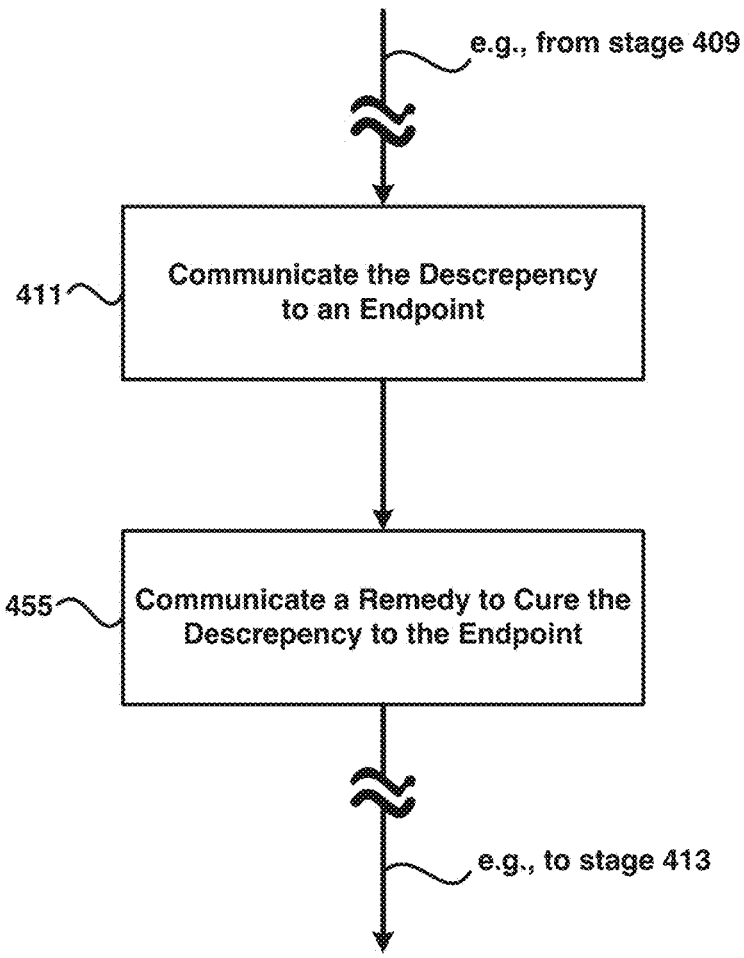
FIG. 4C depicts an example of optional stages for the method of FIG. 4B according to an embodiment of the present application.

If there are discrepancies, then a YES branch may be taken to a stage 411 where the discrepancy may be communicated (e.g., 168) to an endpoint of system 100 (e.g., client 110 or 130). The stage 411 may transition to the stage 413 where the YES or NO branches may be taken as described above. In FIG. 4C optional stages may be executed in a method 400c where after the stage 411, a stage 455 may communicate a remedy to cure the discrepancy (e.g., 169) to and endpoint (e.g., client 110 or 130). After the stage 455, the flow may resume at another stage of method 400b such as the stage 413, for example.

Here, the remedy to cure the discrepancy (e.g., 169) may include presenting the property description 167 of FIG. 4A on a display of the endpoint (e.g., display 135 of client 130) with the items in the description that require correction highlighted or otherwise made evident to the user 165. For example, the un-checked boxes 498d of FIG. 4A may be bolded or otherwise highlighted with instructions for the user 165 to check those boxes to update the description 167 to better match the amenities the user's actually experience while staying at res 190. User 165 may have to use a login and password to review the communicated discrepancy 168, the remedy to cure 169, or both. System 100 and/or processor 150 may communicate the discrepancy 168 and/or the remedy to cure 169 using any suitable form of communication such an email, SMS, instant messaging, texting, posting on a web page, etc., just to name a few.

Some or all of the stages depicted in FIGS. 3A-3B and/or 4B-4C may be implemented electronically using the processor 150 or equivalent compute system(s), network 105 and/or data storage 170, and one or more client devices as described above in reference to FIGS. 1A-1B and FIG. 2, for example. As one example, one or more of the stages that recite receiving, parsing, extracting, comparing, generating, combining, determining (e.g., YES or NO), or communicating may be implemented electronically and may be embodied in one or more algorithms fixed in a non-transitory computer readable medium that includes computer executable instructions configured to be executed on a general purpose computer, processor, CPU, multi-core processor, µC, µP, compute engine, or the like. The stages depicted in FIGS. 3A-3B and/or 4B-4C may be implemented electronically using one or more of an apparatus, a system, a method, or a computer program product. The method and/or computer program product may be implemented electronically using at least one computer or the like (e.g., a server, PC, desktop, data center, tablet, pad, PDA, smartphone, etc.).

Curating Reviews to Form a Curated Corpus of Reviews

Figure 5:
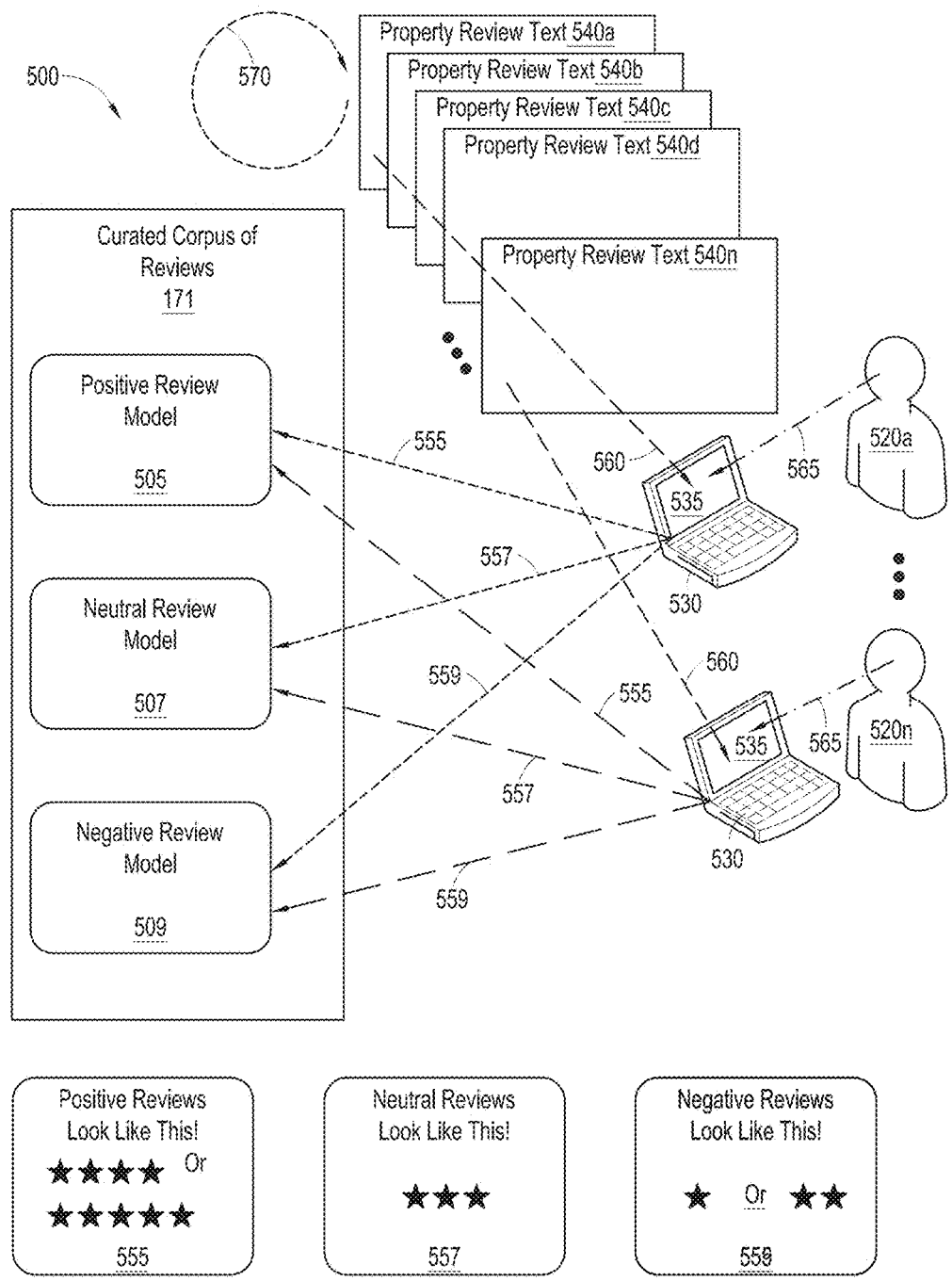
FIG. 5 depicts one example of a methodology for curating reviews to form a curated corpus of reviews according to an embodiment of the present application.

FIG. 5 depicts one example of a methodology 500 for curating reviews to form a curated corpus of reviews 171. An interested party, such as an online marketplace for vacation rentals which serves as an intermediary for owners of a res (e.g., owner 165 of res 190) and rental customers (e.g., user 160) may enlist one or more employees or agent denoted as curators 520a through 520n to read actual property reviews submitted by customers who had an experience 191 with a res (e.g., vacation rental). Here, there may be several hundred to several thousand or more reviews that the curators 520a-520n may review. A database, collection, or other of the submitted reviews may be denoted as property review text 540a-540n. The property review text 540a-540n may be communicated 560 and displayed on a screen 535 of a system such as a laptop computer, terminal, or the like denoted as 530. Each curator 520a-520n may read 565 reviews assigned to that curator and based on the free-text in the review being read, make a determination as to which of the three review models the review is most akin to. For example, each curator 520a-520n may know based on experience or empirical evidence that the free-text in positive reviews (e.g., four-star or five-star ratings) look a particular way and use specific key words that comport with a positive review. A word or set of words (e.g., positive key words) in a positive review may be input 555 into the positive review model 505 of corpus 171. Similarly, neutral reviews will include free-text that may be indicative of a user having a fair experience 191 and the curators 520a-520n upon reading 565 a neutral review may input 557 a word or set of words (e.g., neutral key words) into the neutral review model 507 of corpus 171. In a similar manner, the curators 520a-520n upon reading 565 a negative review and detecting free-text that may be indicative of a user having a poor or unacceptable experience 191 may input 559 a word or set of words (e.g., negative key words) into the negative review model 509 of corpus 171.

From time to time or as necessary, curating the corpus 171 may be repeated 570 to update, modify, correct, amend or otherwise improve the review models 505-509. For example, as the language/words people use to describe positive, neutral, and negative experiences change or adapt due to use of slang or other words that may become vogue, the review text 540a-540n may include those changes in lexicon and the curators 520a-520n may use their knowledge of changes in lexicon to amend the review models 505-509. In some examples, key words associated with a sentiment may be removed from a review model if those key words become obsolete or may be added to a review model of those key words become vogue. The curated corpus of reviews 171 may be different for different native languages such as one corpus 171 for English, a second corpus 171 for French, a third corpus 171 for German, another corpus 171 for Mandarin, yet another corpus 171 for Japanese, still another corpus 171 for Spanish, etc. Some of the curators 520a-520n may be assigned to read 565 review text 540a-540n for specific languages, such as their native language for example.

The corpus 171 and its review models 505-509 are just one non-limiting example of how a curated corpus of reviews may be modeled and other configurations are possible. For example, corpus 171 may include a separate review model for each star rating or other rating system. As one example, there may be a five-star review model, a four-star review model, a three-star review model, a two-star review model, and a one-star review model in corpus 171.

Corpus 171 and/or its review models 505-509 may be in any suitable form including but not limited to a data structure, hash table, look up table, content addressable memory (CAM), array, table, just to name a few. Data storage 170 may contain a plurality of different corpuses 171, such as one for each language, local, country, property type, just to name a few. Network 105 and communications 107, 172, and 152 may be used to curate the corpus 171 and its review models as described above in regards to FIG. 5.

Figure 2:
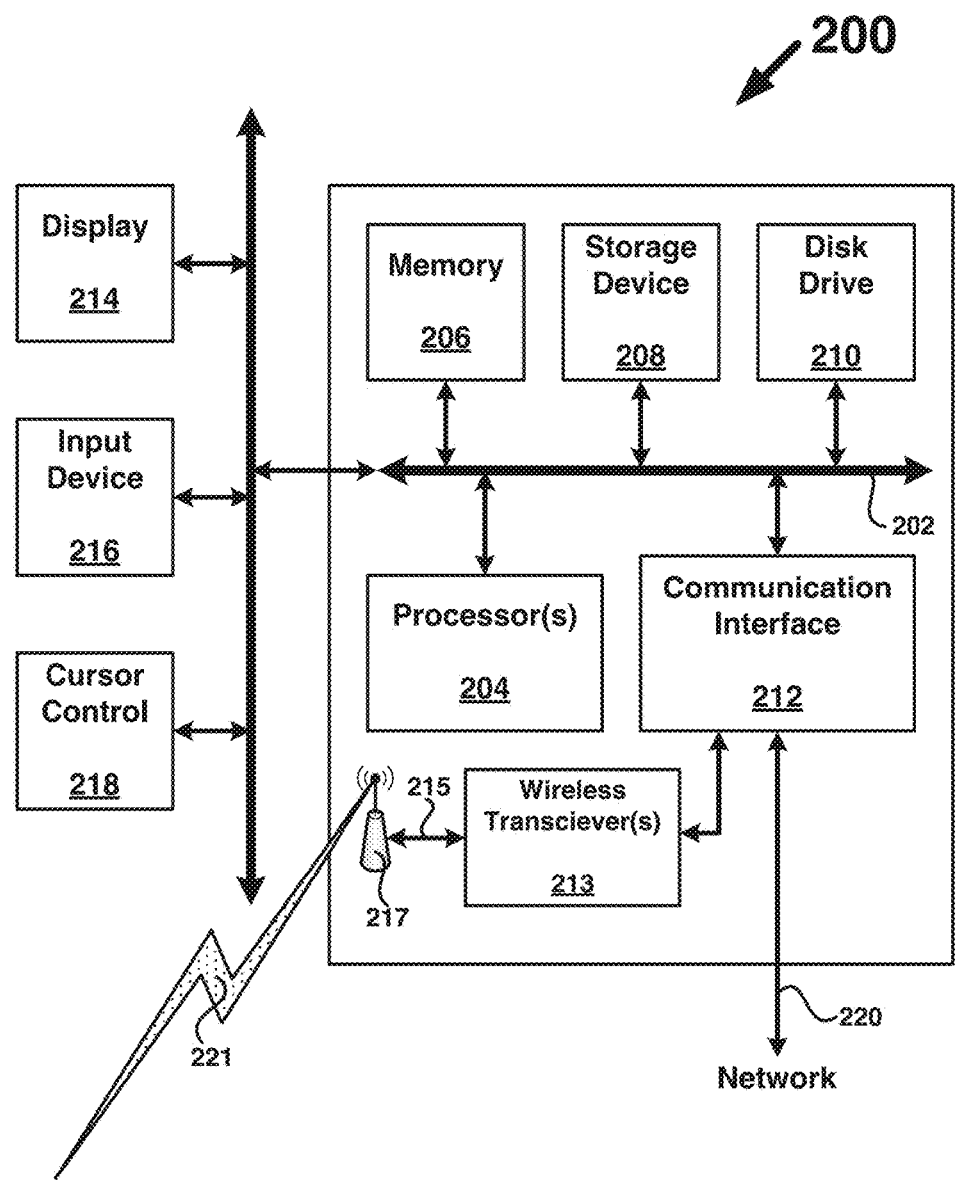
FIG. 2 illustrates an exemplary computer system according to an embodiment of the present application.

FIG. 2 illustrates an exemplary computer system 200 suitable for use in the system 100 depicted in FIGS. 1A-1B and 5. In some examples, computer system 200 may be used to implement computer programs, algorithms, applications, configurations, methods, processes, or other software to perform the above-described techniques. Computer system 200 may include a bus 202 or other communication mechanism for communicating information, which interconnects subsystems and devices, such as one or more processors 204 (e.g., µC, µP, DSP, ASIC, FPGA, Baseband, etc.), system memory 206 (e.g., RAM, SRAM, DRAM, Flash), storage device 208 (e.g., Flash, ROM), disk drive 210 (e.g., magnetic, optical, solid state), communication interface 212 (e.g., modem, Ethernet, WiFi), display 214 (e.g., CRT, LCD, touch screen), input device 216 (e.g., keyboard, stylus), and cursor control 218 (e.g., mouse, trackball, stylus). Some of the elements depicted in computer system 200 may be optional, such as elements 214-218, for example and computer system 200 need not include all of the elements depicted.

According to some examples, computer system 200 performs specific operations by processor 204 executing one or more sequences of one or more instructions stored in system memory 206. Such instructions may be read into system memory 206 from another non-transitory computer readable medium, such as storage device 208 or disk drive 210 (e.g., a HD or SSD). In some examples, circuitry may be used in place of or in combination with software instructions for implementation. The term "non-transitory computer readable medium" refers to any tangible medium that participates in providing instructions to processor 204 for execution. Such a medium may take many forms, including but not limited to, non-volatile media and volatile media. Non-volatile media includes, for example, optical, magnetic, or solid state disks, such as disk drive 210. Volatile media includes dynamic memory, such as system memory 206. Common forms of non-transitory computer readable media includes, for example, floppy disk, flexible disk, hard disk, SSD, magnetic tape, any other magnetic medium, CD-ROM, DVD-ROM, Blu-Ray ROM, USB thumb drive, SD Card, any other optical medium, punch cards, paper tape, any other physical medium with patterns of holes, RAM, PROM, EPROM, FLASH-EPROM, any other memory chip or cartridge, or any other medium from which a computer may read.

Instructions may further be transmitted or received using a transmission medium. The term "transmission medium" may include any tangible or intangible medium capable of storing, encoding or carrying instructions for execution by the machine, and includes digital or analog communications signals or other intangible medium to facilitate communication of such instructions. Transmission media may include but is not limited to coaxial cables, copper wire, and fiber optics, including wires that comprise bus 202 for transmitting a computer data signal. In some examples, execution of the sequences of instructions may be performed by a single computer system 200. According to some examples, two or more computer systems 200 coupled by communication link 220 (e.g., LAN, Ethernet, PSTN, one or more varieties of wireless networks) may perform the sequence of instructions in coordination with one another. Computer system 200 may transmit and receive messages, data, and instructions, including programs, (i.e., application code), through communication link 220 and communication interface 212. Received program code may be executed by processor 204 as it is received, and/or stored in disk drive 210, or other non-volatile storage for later execution. Computer system 200 may optionally include a wireless transceiver 213 in communication with the communication interface 212 and coupled 215 with an antenna 217 for receiving and generating RF signals 221, such as from a WiFi network, BT radio, or other wireless network and/or wireless devices, for example. Examples of wireless devices may include but is not limited to those depicted in FIG. 1A such as one or more of devices 105, 110, 120, 130, 140, 150, 151, and 170.

Although the foregoing examples have been described in some detail for purposes of clarity of understanding, the above-described conceptual techniques are not limited to the details provided. There are many alternative ways of implementing the above-described conceptual techniques. The disclosed examples are illustrative and not restrictive.

What is claimed is:

1. A system for detecting discrepancies within property listings on a network-based information resource, the system comprising:
    data storage including a property listing for a property, the property listing accessible to client computing devices of the network-based information resource via a network and identifying a set of attributes designated by an agent as associated with the property, wherein the property corresponds to an occupiable, real property, and wherein the set of attributes are displayed to client computing devices that access the property listing on the network-based information resource;
    a processor in communication with the data storage, the processor configured with computer-executable instructions to at least:
        generate instructions, parseable by an agent computing device associated with the agent, to display a user interface enabling selection of the set of attributes designated by the agent as associated with the property for display within the property listing on the network-based information resource;
        transmit the instructions to the agent computing device via a network;
        receive, from the agent computing device and via the network, the information identifying the set of attributes;
        modify the property listing in the data storage to reflect the set of attributes designated by the agent as associated with the property;
        generate instructions, parseable by a client computing device, to display a user interface enabling submission of free-text review data to be included within the property-listing on the network-based information resource;
        receive, from the client computing device and via the network, the free-text review data submitted for inclusion within the property listing on the network-based information resource;
        parse the free-text review data into a set of textual terms;
        extract, from the set of textual terms, a textual term referencing an attribute purported to be associated with the property by a client generating the free-text review data;
        conduct a comparison of i) the set of attributes designated by the agent as associated with the property and ii) the attribute purported to be associated with the property by the client;
        identify, from at least the comparison, a discrepancy between the set of attributes designated by the agent as associated with the property and the attribute purported to be associated with the property by the client;
        communicate the discrepancy to the agent computing device associated with the agent.

2. The system of claim 1, wherein the set of attributes includes an amenity of the property.

3. The system of claim 1, wherein the processor is configured to communicate the discrepancy by transmitting to the agent computing device a proposal to modify the set of attributes designated by the agent as associated with the property to add the attribute purported to be associated with the property by the client.

4. The system of claim 1, wherein the processor is configured to communicate the discrepancy by transmitting to the agent computing device a request to verify that the set of attributes designated by the agent as associated with the property are correct.

5. The system of claim 1, wherein the processor is configured to communicate the discrepancy by transmitting to the agent computing device a request to add the attribute purported to be associated with the property to the set of attributes designated by the agent as associated with a property.

6. A non-transitory computer readable medium including computer-executable instructions that, when executed by a computing system to detect discrepancies within property listings on a network-based information resource, cause the computing system to at least:
    generate instructions, parseable by a computing device associated with an agent of the property, to display a user interface enabling selection of a set of attributes designated by the agent as associated with the property;
    transmit the instructions to the computing device associated with the agent via a network;

receive, from the agent computing device and via the network, information identifying the set of attributes;

modify, in data storage associated with the computing system, a property listing for the property to reflect the set of attributes designated by the agent as associated with the property, wherein the property listing is accessible to client computing devices of the network-based information resource via the network, and wherein the set of attributes are displayed to client computing devices that access the property listing on the network-based information resource;

generate instructions, parseable by a client computing device, to display a user interface enabling submission of free-text review data to be included within the property-listing on the network-based information resource;

receive, from the client computing device and via the network, the free-text review data submitted for inclusion within the property listing on the network-based information resource;

parse the free-text review data into a set of textual terms;

extract, from the set of textual terms, a textual term referencing an attribute purported to be associated with a property by the author of the free-text review data, wherein the property corresponds to an occupiable, real property;

conduct a comparison of the attribute purported to be associated with the property by the author of the free-text review data and the set of attributes currently designated as associated with the property by the agent of the property;

identify, from at least the comparison, a discrepancy between the set of attributes currently designated as associated with the property and the attribute purported to be associated with the property by the author; and communicate the discrepancy to the computing device associated with the agent.

7. The non-transitory computer readable medium of claim 6, wherein the computer-executable instructions cause the computing system to communicate the discrepancy at least partly by identifying the attribute purported to be associated with the property by the author.

8. The non-transitory computer readable medium of claim 7, wherein the computer-executable instructions cause the computing system to communicate the discrepancy at least partly by requesting to add the attribute purported to be associated with the property to the set of attributes currently designated as associated with a property.

9. The non-transitory computer readable medium of claim 6, wherein the computer-executable instructions cause the computing system to communicate the discrepancy at least partly by transmitting to a request to verify that the set of attributes currently designated as associated with the property are correct.

10. A computer-implemented method to detect discrepancies within property listings on a network-based information resource, the computer-implemented method comprising:

generating instructions, parseable by a computing device associated with an agent of the property, to display a user interface enabling selection of a set of attributes designated by the agent as associated with the property;

transmitting the instructions to the computing device associated with the agent via a network;

receiving, from the agent computing device and via the network, information identifying the set of attributes;

modifying, in data storage associated with the network-based information resource, a property listing for the property to reflect the set of attributes designated by the agent as associated with the property, wherein the property listing is accessible to client computing devices of the network-based information resource via the network, and wherein the set of attributes are displayed to client computing devices that access the property listing on the network-based information resource;

generating instructions, parseable by a client computing device, to display a user interface enabling submission of free-text review data to be included within the property-listing on the network-based information resource;

receiving, from the client computing device and via the network, the free-text review data submitted for inclusion within the property listing on the network-based information resource;

parsing the free-text review data into a set of textual terms;

extracting, from the set of textual terms, a textual term referencing an attribute purported to be associated with a property by the author of the free-text review data, wherein the property corresponds to an occupiable, real property;

conducting a comparison of the attribute purported to be associated with the property by the author and the set of attributes currently designated as associated with the property by the agent of the property;

identifying, from at least the comparison, a discrepancy between the set of attributes currently designated as associated with the property and the attribute purported to be associated with the property by the author; and communicating the discrepancy to the computing device associated with the agent.

11. The computer-implemented method of claim 10, wherein communicating the discrepancy includes identifying the attribute purported to be associated with the property by the author.

12. The computer-implemented method of claim 11, wherein the communicating the discrepancy includes proposing to add the attribute purported to be associated with the property by the author to the set of attributes currently designated as associated with the property.

13. The computer-implemented method of claim 10, wherein communicating the discrepancy comprising transmitting a request to verify that the set of attributes currently designated as associated with the property are correct.

* * * * *